US012220913B2

(12) United States Patent
Shimotsusa

(10) Patent No.: US 12,220,913 B2
(45) Date of Patent: Feb. 11, 2025

(54) LIQUID EJECTION HEAD

(71) Applicant: CANON KABUSHIKI KAISHA, Tokyo (JP)

(72) Inventor: Mineo Shimotsusa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 17/932,220

(22) Filed: Sep. 14, 2022

(65) Prior Publication Data

US 2023/0088227 A1 Mar. 23, 2023

(30) Foreign Application Priority Data

Sep. 17, 2021 (JP) ............................ JP2021-151989

(51) Int. Cl.
*B41J 2/045* (2006.01)

(52) U.S. Cl.
CPC ......... *B41J 2/04563* (2013.01); *B41J 2/0458* (2013.01)

(58) Field of Classification Search
CPC .. B41J 2/0458; B41J 2/14129; B41J 2/14153; B41J 2/04563; B41J 2/04541; B41J 2/0451; B41J 2/14072; B41J 2202/12; B41J 2202/20; B41J 2/14; B41J 2/1412; B41J 2002/14491; B41J 2202/18; B41J 2002/14169; B41J 2002/14403
See application file for complete search history.

(56) References Cited

U.S. PATENT DOCUMENTS

2009/0002428 A1* 1/2009 Min ....................... B41J 2/0458 347/19
2021/0370669 A1* 12/2021 Shimotsusa .......... B41J 2/04563

FOREIGN PATENT DOCUMENTS

JP 2009-083227 A 4/2009

* cited by examiner

*Primary Examiner* — Jannelle M Lebron
(74) *Attorney, Agent, or Firm* — Canon U.S.A., Inc. I.P. Division

(57) ABSTRACT

A liquid ejection head including a base substrate, an ejection port to eject a liquid, a heating element formed above the base substrate that heats the liquid to eject the liquid from the ejection port, a temperature detection element formed above the base substrate that detects a temperature of the liquid, a wiring layer connected to the heating element, a protective layer formed on the base substrate that protects the heating element and the wiring layer from the liquid, and a liquid supply port that penetrates the base substrate and supplies the liquid to the ejection port. When viewed in a direction perpendicular to the base substrate, the temperature detection element is disposed between the heating element and the liquid supply port, and the temperature detection element is formed on the protective layer.

15 Claims, 11 Drawing Sheets

LIQUID EJECTION HEAD

BACKGROUND

Field of the Disclosure

The present disclosure relates to a liquid ejection head that ejects a liquid.

Description of the Related Art

A liquid ejection printer is an example of a recording device that ejects a liquid and performs a recording operation. The liquid ejection printer includes a liquid ejection head, which is a component that ejects a liquid. Some liquid ejection heads have a configuration of film-boiling a liquid to generate pressure used to eject the liquid from an ejection port. To film boil a liquid, the liquid ejection head includes a heating element.

A liquid ejection head using a heating element has been developed that includes a temperature detection element (a temperature sensor) capable of detecting the temperature of the liquid to detect whether the liquid is normally ejected from the ejection port (hereinafter referred to as "ejection detection"). Japanese Patent Laid-Open No. 2009-83227 describes a method for detecting ejection by using a temperature detection element called a flow sensor. Ejection detection is performed by using the fact that the liquid temperature detected by the flow sensor differs between a normal mode in which the liquid is normally ejected from the ejection port and a defective ejection mode.

According to Japanese Patent Laid-Open No. 2009-83227, since a protective layer or the like is formed on the flow sensor, the flow sensor detects the temperature of a liquid via the protective layer or the like, which decreases the sensitivity of liquid temperature detection.

SUMMARY OF THE INVENTION

Accordingly, the present disclosure provides a liquid ejection head capable of detecting the liquid temperature with high sensitivity.

According to the present disclosure, a liquid ejection head includes a base substrate, an ejection port configured to eject a liquid, a heating element formed above the base substrate, wherein the heating element heats the liquid to eject the liquid from the ejection port, a temperature detection element formed above the base substrate, wherein the temperature detection element detects a temperature of the liquid, a wiring layer formed above the base substrate, wherein the base substrate is connected to the heating element, a protective layer formed on the base substrate, wherein the protective layer protects the heating element and the wiring layer from the liquid, and a liquid supply port configured to penetrate the base substrate, wherein the liquid supply port supplies the liquid to the ejection port. When viewed in a direction perpendicular to the base substrate, the temperature detection element is disposed between the heating element and the liquid supply port, and the temperature detection element is formed on the protective layer.

Further features of the present disclosure will become apparent from the following description of exemplary embodiments with reference to the attached drawings.

DESCRIPTION OF THE EMBODIMENTS

Figure 1A:
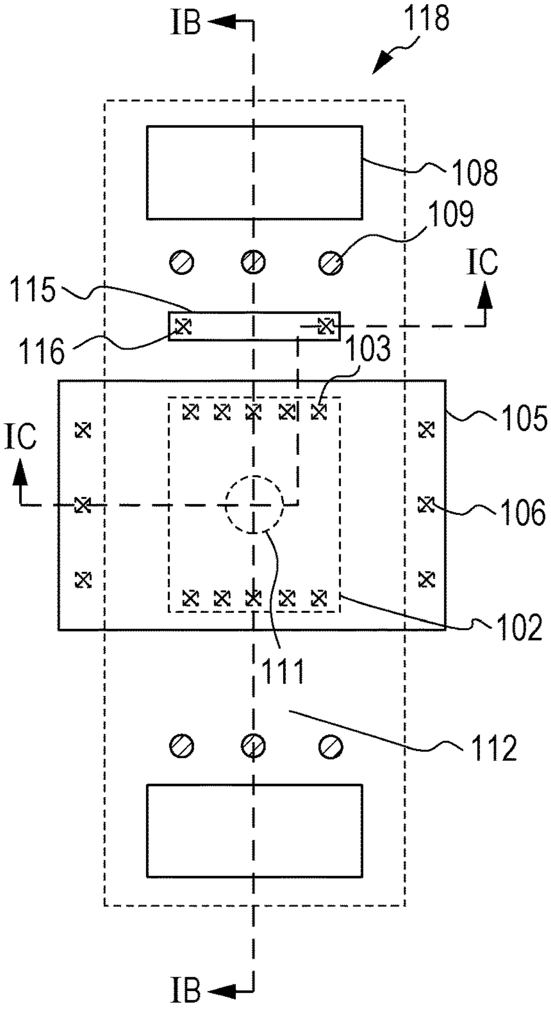
FIGS. 1A to 1C are schematic illustrations of a liquid ejection head.

Exemplary embodiments of the present disclosure are described below with reference to the accompanying drawings. Identical or similar configurations are designated by the same reference numerals throughout the drawings, and further description is not provided as appropriate.

First Embodiment

Figure 1B:
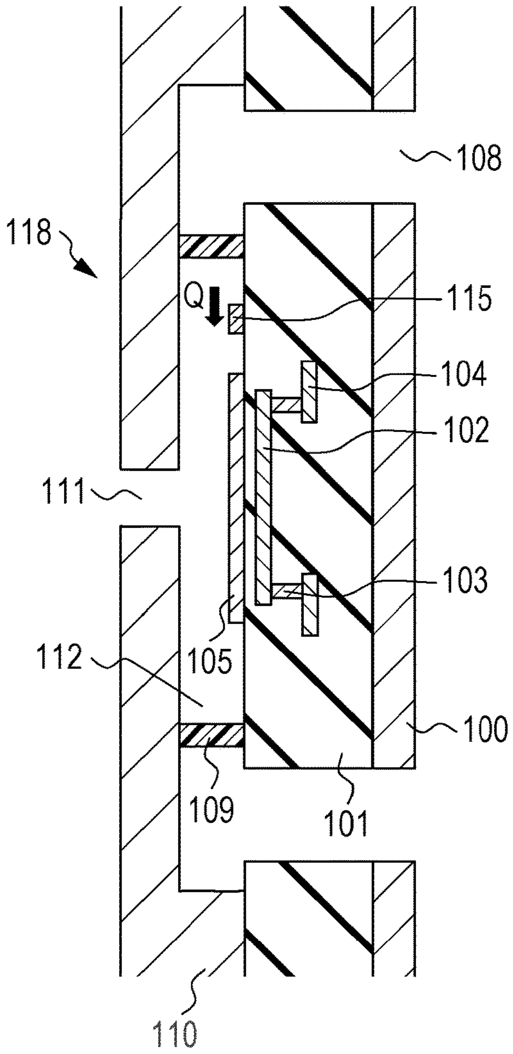
Figure 1C:
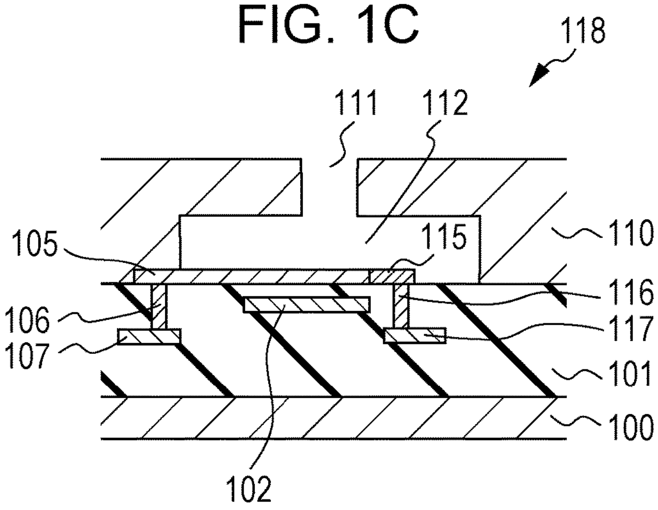

The first embodiment is described with reference to FIGS. 1A to 1C. FIG. 1A is a schematic plan view of a liquid ejection head. FIG. 1B is a schematic cross-sectional view of the liquid ejection head taken along a line IB-IB of FIG. 1A. FIG. 1C is a schematic cross-sectional view of the liquid ejection head taken along a line IC-IC of FIG. 1A.

The liquid ejection head include a base substrate 100 made of, for example, single crystal silicon. The base substrate 100 has an insulating layer 101 disposed thereon. The insulating layer 101 is formed of, for example, an inorganic material of silicon oxide and has electrical insulating properties. The insulating layer 101 insulates wiring lines. Although not illustrated, a wiring layer composed of transistors and multilayer wiring is disposed in and on the base substrate 100. The wiring layer is electrically connected to a heating resistance element 102 (also referred to as a heating element) that heats liquid to eject the liquid from the ejection port. The insulating layer 101 also has a function of protecting the wiring layer and the like from the liquid. For this reason, the insulating layer 101 is also referred to as a protective layer.

The heating resistance element 102 is disposed in the insulating layer 101. The heating resistance element 102 is connected to power supply wiring 104 via a via 103. The heating resistance element 102 is made of a resistance material, such as tantalum nitride silicon or tungsten nitride silicon.

A cavitation resistance film 105 is disposed on the insulating layer 101 on the heating element (on the heating resistance element 102). The cavitation resistance film 105 is a film for protecting the heating resistance element 102, the insulating layer 101, the wiring layer, and the like from cavitation that occurs due to driving of the heating resistance element 102. The cavitation resistance film 105 is connected to signal wiring 107 via a via 106. However, since the cavitation resistance film 105 can be "floating", the cavitation resistance film 105 does not necessarily have to be connected to the via 106 and the signal wiring 107. The cavitation resistance film 105 is formed of a single layer or a multilayer of a metal material or alloy having high mechanical strength and chemical strength (for example, iridium, tantalum, titanium, tungsten, silicon, tantalum nitride silicon, or tungsten nitride silicon).

A filter 109 and a nozzle forming member 110 made of a photosensitive resin or the like form an ejection port 111 and a foaming chamber 112 on the cavitation resistance film 105. In addition, a liquid supply port 108 (also simply referred to as a "supply port") is formed so as to penetrate the base substrate 100 and the insulating layer 101. The foaming chamber 112 is a region that contributes to ejection of the liquid, is a region that is slightly larger than the heating resistance element 102 in plan view, and is a region located closer to the ejection port 111 than at least the wall of the nozzle forming member 110 and the filter 109.

A temperature detection element 115 is disposed in the same layer as the cavitation resistance film 105. The cavitation resistance film 105 is formed on the protective layer. The temperature detection element 115 is also formed on the protective layer. For this reason, the temperature detection element 115 may be in direct contact with the liquid. As viewed in a direction perpendicular to the base substrate 100, the temperature detection element 115 is disposed between the heating resistance element 102 and the liquid supply port 108. The temperature detection element 115 is connected to signal wiring 117 via a via 116. The temperature detection element 115 is formed of a single layer or a multilayer of a metal material or alloy having a high coefficient of resistance temperature (for example, iridium, tantalum, titanium, tungsten, silicon, tantalum nitride silicon, or tungsten nitride silicon). The temperature detection element 115 may be made of the same material as the cavitation resistance film 105. Furthermore, the temperature detection element 115 may be formed at the same time as the cavitation resistance film 105. If the temperature detection element 115 is manufactured in the manufacturing process of the cavitation resistance film 105, the manufacturing process dedicated to the temperature detection element 115 is not needed and, thus, the manufacturing cost can be reduced.

The power supply wiring 104, the signal wiring 107, and the signal wiring 117 are made of, for example, a metal material containing aluminum or copper as a main component. The vias 103, 106 and 117 are formed of, for example, a metal material containing tungsten or copper as a main component. The uppermost surface of the insulating layer 101 is planarized. The planarization process is performed by, for example, CMP (Chemical Mechanical Polishing). The planarization process may be performed before or after the forming process of each of the vias, the signal wiring, the power supply wiring, the heating resistance element, and the temperature detection element. The film thickness of the heating resistance element 102 is 10 nm to 50 nm, and the film thickness of the power supply wiring 104 is 500 nm to 1000 nm. As described above, the insulating layer 101 is provided with the plurality of conductive layers such as multilayer wiring (not illustrated), the heating resistance element 102, via 103, 106, 116, power supply wiring 104, signal wiring 107 and 117, cavitation resistance film 105, and temperature detection element 115.

The liquid ejection head uses the heat energy of the heating resistance element 102 to eject the liquid in the foaming chamber 112 from the ejection port 111. Subsequently, the foaming chamber 112 is refilled with the tailing of the ejected liquid and liquid supplied from the supply port 108. At this time, the temperature detection element 115 detects a change in temperature and determines whether the liquid is normally ejected. If the liquid is normally ejected, the amount of the refilled liquid is large and, thus, a large amount of the liquid having a low temperature flows on the temperature detection element 115. However, if the liquid is not ejected normally, the amount of refilled liquid is small (or zero) and, thus, the amount of low-temperature liquid flowing on the temperature detection element 115 is small. Due to the difference, the temperature detection element 115 detects a low temperature in the case of normal ejection and detects a high temperature in the case of defective ejection. By using this temperature difference, ejection detection is made.

Figures 2A, 2B, 2C, 2D, 2E:
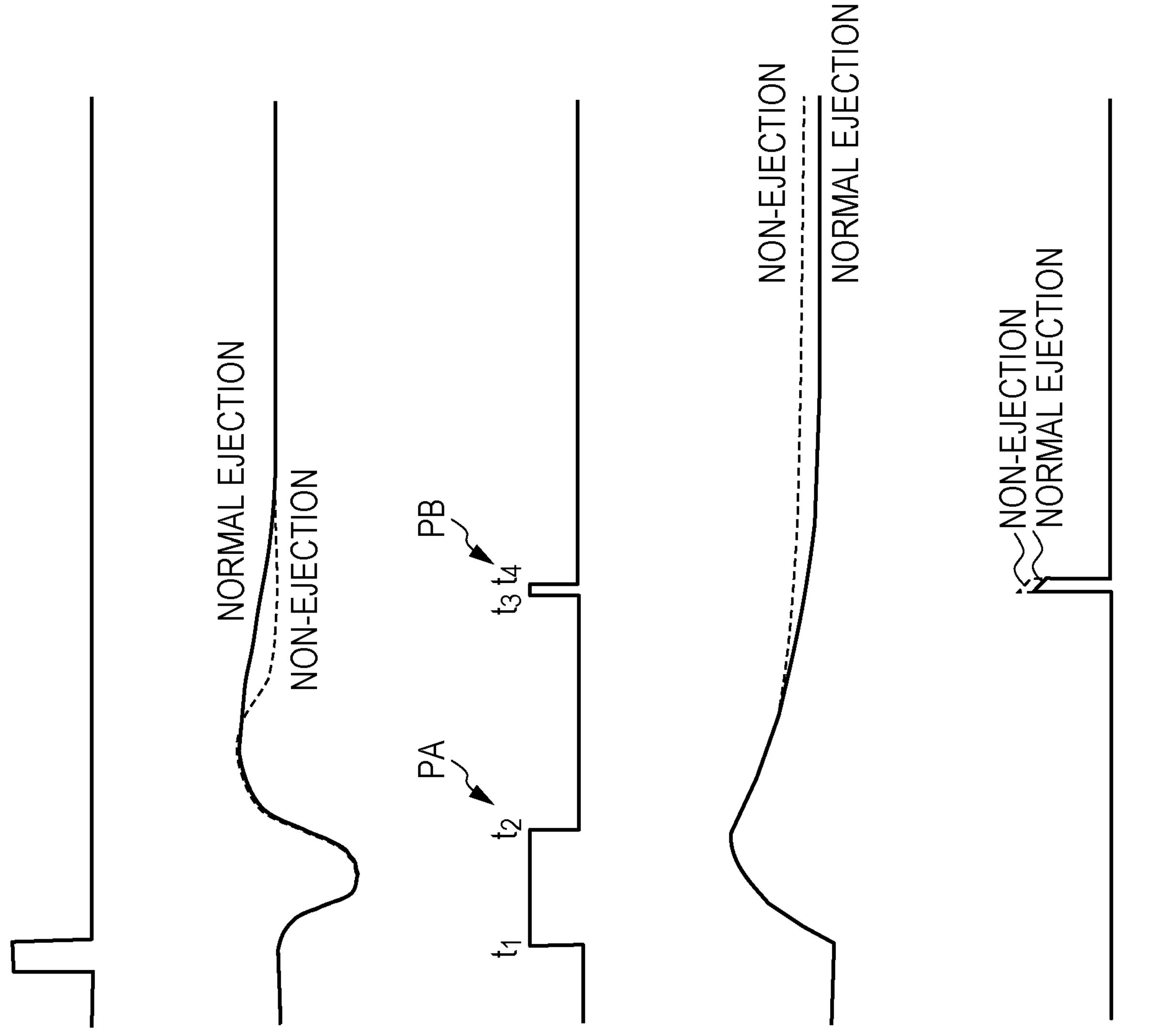
FIGS. 2A to 2E illustrates the operating principle of the liquid ejection head.

A particular example of liquid ejection and a method for detecting the liquid ejection using a temperature detection element is described with reference to FIGS. 2A to 2E and FIG. 3 in addition to FIGS. 1A to 1C. FIGS. 2A to 2E are schematic illustrations of the operating principle according to the present embodiment. FIG. 2A is a waveform diagram of a driving pulse applied to the heating resistance element 102. FIG. 2B illustrates a change in the flow rate of the liquid on the time axis when the direction from the supply port 108 to the ejection port 111 illustrated in FIGS. 1A to 1C is positive. FIG. 2C is a waveform diagram of a current applied to the temperature detection element 115. FIG. 2D illustrates a temperature change of the liquid on the temperature detection element 115 on the time axis.

FIG. 2E is a waveform diagram of the detected output voltage corresponding to the temperature change of the liquid.

As illustrated in FIG. 2C, the current supplied to the temperature detection element 115 includes a pulse PA having a high level in the period from a time t1 to a time t2 and a pulse PB having a high level in the period from a time t3 to a time t4. The pulse PA is the current applied to heat the temperature detection element 115. The pulse PB is a current to detect the resistance value of the temperature detection element 115.

Figure 3:
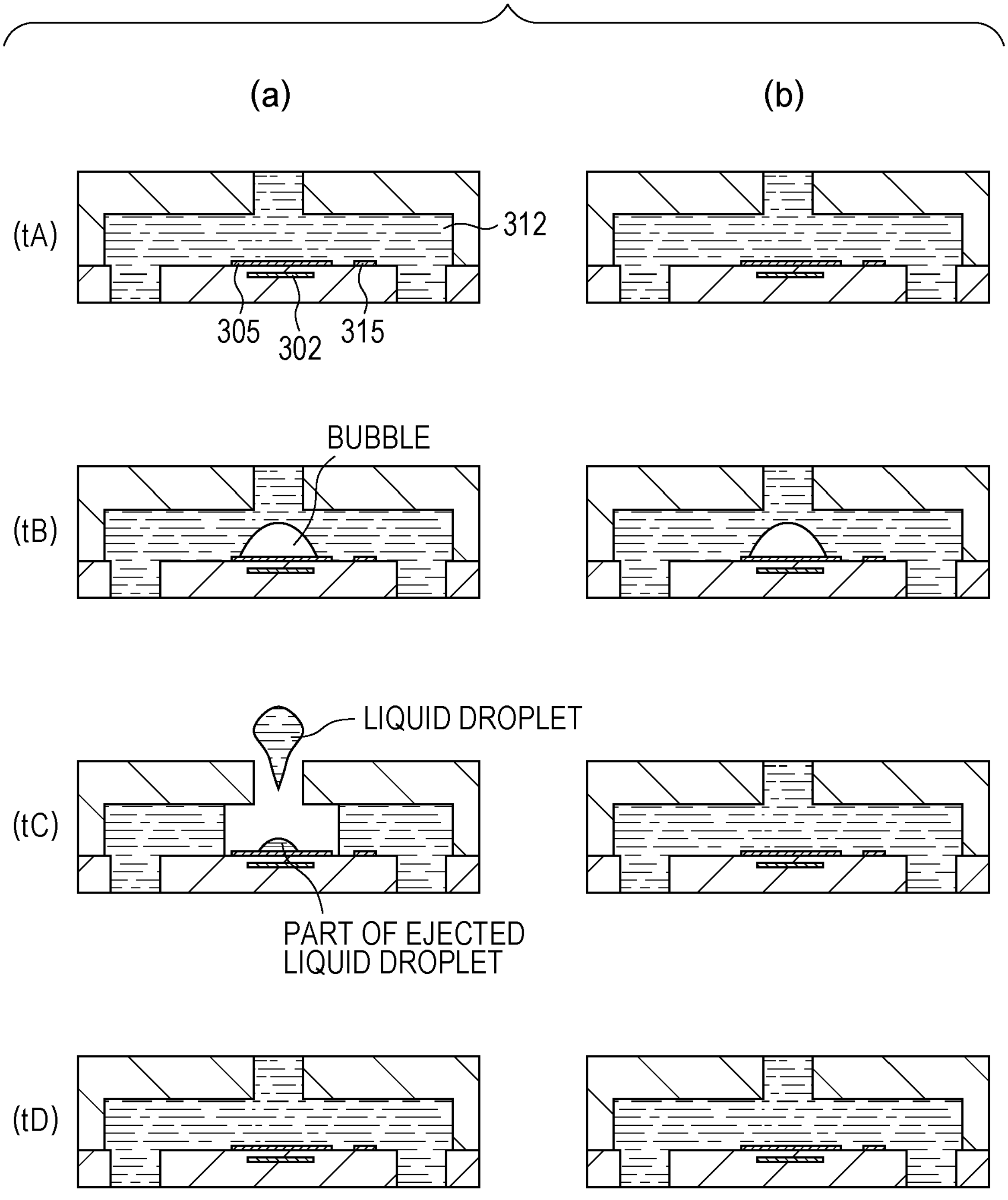
FIG. 3 illustrates the states of liquid in a foaming chamber of the liquid ejection head.

FIG. 3 is a schematic illustration of the behavior of the liquid in the foaming chamber during the ejection operation according to the present embodiment. For ease of understanding the positional relationship, a heating resistance element 302, a cavitation resistance film 305, a temperature detection element 315, and a foaming chamber 312 are schematically illustrated. FIG. 3(*a*) illustrates the behavior at the time of normal ejection, and FIG. 3(*b*) illustrates the behavior at the time of typical non-ejection.

The behavior at the time of normal ejection is described with reference to FIG. 3(*a*). When a driving pulse is applied to the heating resistance element 302 in a steady state (tA), the boiling phenomenon occurs in the liquid above the heating resistance element 302 inside the foaming chamber and, thus, a bubble grows (tB). When the application of the pulse is completed, the bubble disappears.

Along with the disappearance of the bubble, the front part of the liquid separates, and the separated part flies in the air in the form of a liquid droplet and lands on, for example, a recording medium. In addition, the remaining part of the liquid other than the separated part retreats into the foaming chamber 312 due to the negative pressure generated at the time of disappearance of the bubble. This liquid is called the tailing of liquid or part of an ejected droplet and crashes onto a base substrate surface (tC). When the foaming chamber 312 is refilled with the liquid, the liquid interface moves toward the ejection port 111. This is done by the capillary force in the foaming chamber 312. As a result, as illustrated in FIG. 2B, if the foaming operation is performed, the liquid once flows toward the supply port 108 and, after the bubble volume is maximized, flows toward the ejection port 111. When the liquid refill is completed, the state returns to the steady state (tD).

The behavior at the time of non-ejection is described with reference to FIG. 3(*b*). When a driving pulse is applied to the heating resistance element 302, a boiling phenomenon occurs and, thus, the bubble grows. However, the liquid does not separate. Since the liquid is not ejected as described above, the amount of liquid reduced by the liquid ejection operation is zero. For this reason, the amount of refilled liquid is smaller than that in the case of normal ejection. In addition, the time required for refilling is increased.

The temperatures of the liquid in the cases of normal ejection and non-ejection change as illustrated in FIG. 2D. Furthermore, the difference occurs between the detected output voltages as illustrated in FIG. 2E. By using the difference in liquid temperature and the difference in output voltage, determination as to whether the ejection is normally performed can be made. Note that FIG. 2E illustrates an example in which a material having a positive coefficient of resistance temperature is used for the temperature detection element, and the tendency is reversed when a material having a negative coefficient of resistance temperature is used for the temperature detection element.

According to the present embodiment, the temperature detection element 115 is disposed in the same layer as the cavitation resistance film 105 and is disposed as a metal material closest to the liquid in the foaming chamber 112. That is, since the temperature detection element 115 is formed on the protective layer, the temperature detection element 115 may be in direct contact with the liquid. For this reason, the temperature detection element 115 can have high sensitivity. Since the temperature detection element 115 has high sensitivity, the occurrence of erroneous detection of ejection can be prevented.

To increase the temperature detection sensitivity, the temperature detection element 115 may be appropriately heated before detecting the temperature. By heating the temperature detection element 115 in advance, the temperature difference that occurs at the time of refilling the liquid increases and, thus, the temperature can be detected with higher accuracy.

Second Embodiment

Figure 4A:
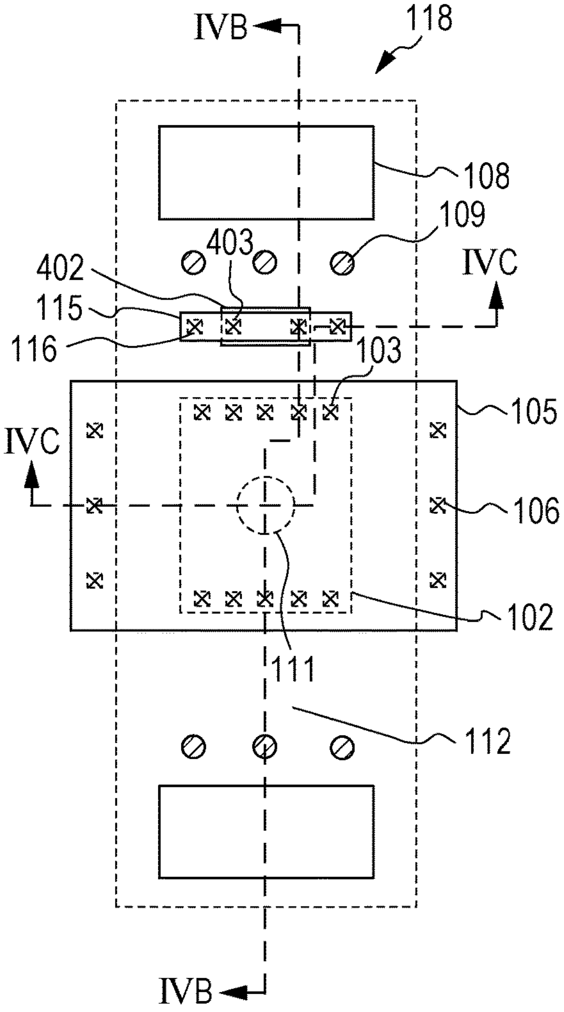
FIGS. 4A to 4C are a plan view and cross-sectional views schematically illustrating a liquid ejection head.
Figure 4B:
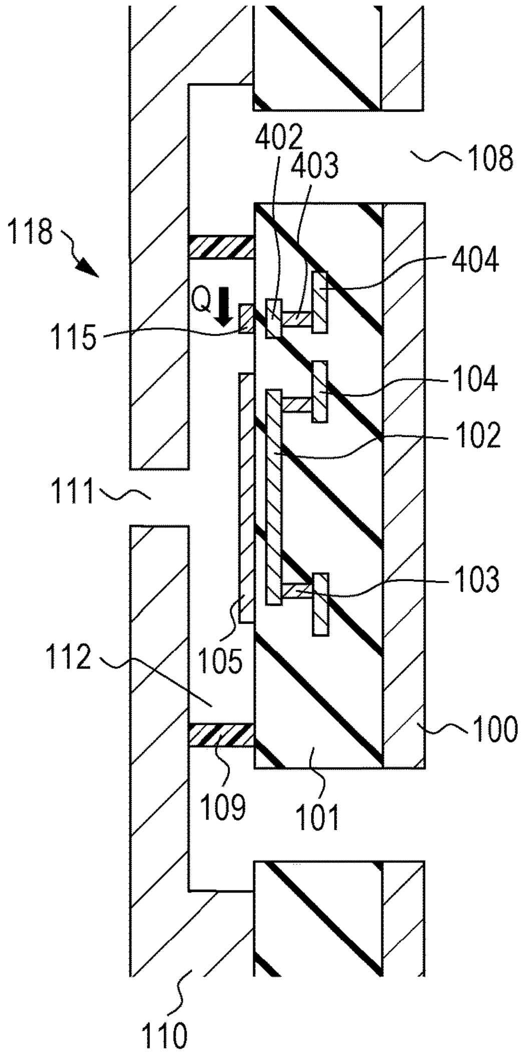
Figure 4C:
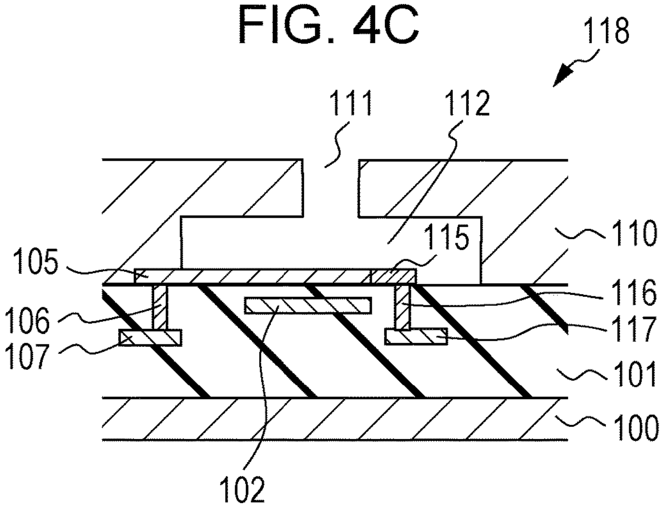

The second embodiment is described with reference to FIGS. 4A to 4C. FIG. 4A is a schematic plan view of a liquid ejection head 118. FIG. 4B is a schematic cross-sectional view of the liquid ejection head 118 taken along a line IVB-IVB of FIG. 4A. FIG. 4C is a schematic cross-sectional view of the liquid ejection head 118 taken along a line IVC-IVC of FIG. 4A. The second embodiment is described as an example of an embodiment in which the sensitivity is further increased by heating a temperature detection element by using a second heating resistance element instead of self-heating of the temperature detection element.

According to the second embodiment, a second heating resistance element 402 is disposed below the temperature detection element 115 via the insulating layer 101. The heating resistance element 402 is connected to power supply wiring 404 via a via 403. The second heating resistance element 402 is formed of a resistance material, such as tantalum nitride silicon or tungsten nitride silicon. When the second heating resistance element 402 is manufactured using the same material and the same process as the first heating resistance element 102, the heating resistance element 102 can be disposed without increasing the manufacturing cost. The power supply wiring 404 is formed of, for example, a metal material containing aluminum or copper as a main component. The via 403 is formed of, for example, a metal material containing tungsten or copper as a main component.

Figure 5A:
FIGS. 5A to 5E illustrate the operating principle of the liquid ejection head.
Figure 5B:
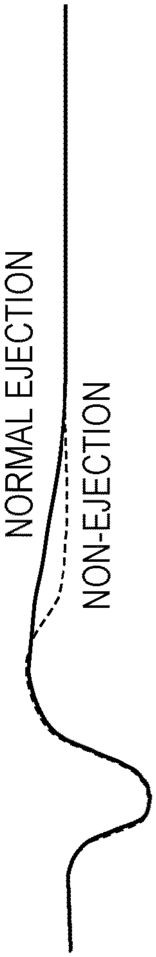
Figure 5C:
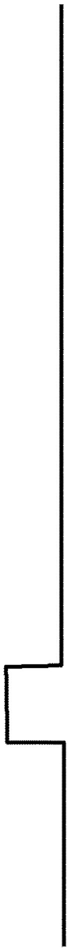
Figure 5D:
Figure 5E:
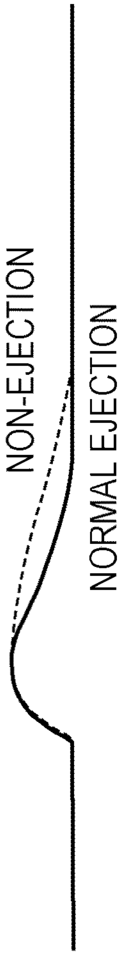

A particular example of liquid ejection and a method of detection using the temperature detection element is described below with reference to FIGS. 5A to 5E in addition to FIGS. 4A to 4C. FIGS. 5A to 5E are schematic illustrations of the operating principle according to the present embodiment. FIG. 5A is a waveform diagram of a driving pulse applied to the first heating resistance element 102. FIG. 5B illustrates a change in the flow rate of the liquid on the time axis when the direction from the supply port 108 to the ejection port 111 illustrated in FIGS. 5A to 5E is positive. FIG. 5C is a waveform diagram of the current applied to the second heating resistance element 402. FIG. 5D is a waveform diagram of the current applied to the temperature detection element 115. FIG. 5E is a waveform diagram of the detected output voltage corresponding to a temperature change of the liquid.

The current applied to the second heating resistance element 402 in FIG. 5C is a current applied to heat the temperature detection element 115 and the liquid around the temperature detection element 115. The current applied to the second heating resistance element 402 is controlled to such an extent that the liquid around the temperature detection element 115 does not foam. The current applied to the temperature detection element 115 in FIG. 5D is a current applied to detect the resistance value of the temperature detection element 115. As illustrated in FIG. 5E, the detected output voltage differs at the time of non-ejection from the time of normal ejection and, thus, it can be determined whether the liquid is being ejected normally.

According to the present embodiment, the second heating resistance element 402 can sufficiently heat the temperature detection element 115 and the liquid around the temperature detection element 115, so that the temperature change of the temperature detection element 115 can be increased. As a result, a higher sensitivity can be obtained.

Third Embodiment

Figure 6A:
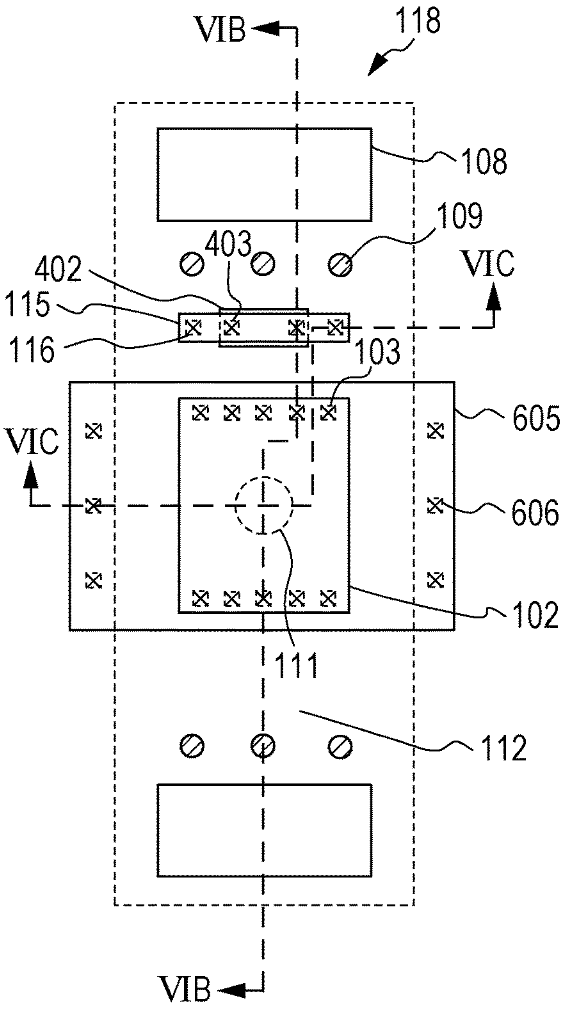
FIGS. 6A to 6C are a plan view and cross-sectional views schematically illustrating a liquid ejection head.
Figure 6B:
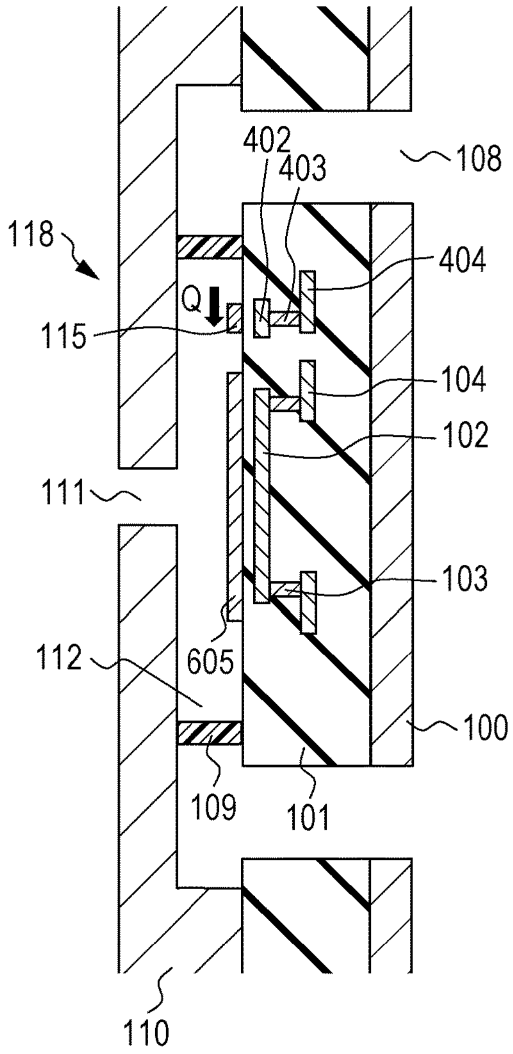
Figure 6C:
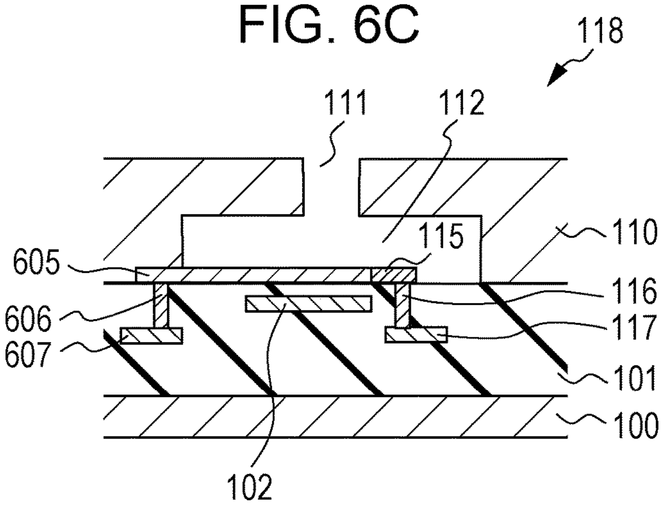

The third embodiment is described with reference to FIGS. 6A to 6C. FIG. 6A is a schematic plan view of a liquid ejection head 118. FIG. 6B is a schematic cross-sectional view of the liquid ejection head 118 taken along a line VIB-VIB of FIG. 6A. FIG. 6C is a schematic cross-sectional view of the liquid ejection head 118 taken along a line VIC-VIC of FIG. 6A. The third embodiment is described as an example of an embodiment in which the sensitivity can be increased, or an additional function can be provided by detecting a different phenomenon by using a different temperature detection element.

According to the third embodiment, a second temperature detection element 605 is disposed on the heating resistance element 102 via the insulating layer 101. The second temperature detection element 605 is connected to signal wiring 607 via a via 606. The second temperature detection element 605 is formed of a single layer or a multilayer of a metal material or alloy having a high coefficient of resistance temperature (for example, iridium, tantalum, titanium, tungsten, silicon, tantalum nitride silicon, or tungsten nitride silicon). The second temperature detection element 605 may have a cavitation resistance function. If the second temperature detection element 605 is manufactured using the same material and the same process as the first temperature detection element 115, the second temperature detection element 605 can be disposed without increasing the manufacturing cost. The signal wiring 607 is formed of, for example, a metal material containing aluminum or copper as a main component. The via 606 is formed of, for example, a metal material containing tungsten or copper as a main component.

Figures 7A, 7B, 7C, 7D, 7E, 7F, 7G:
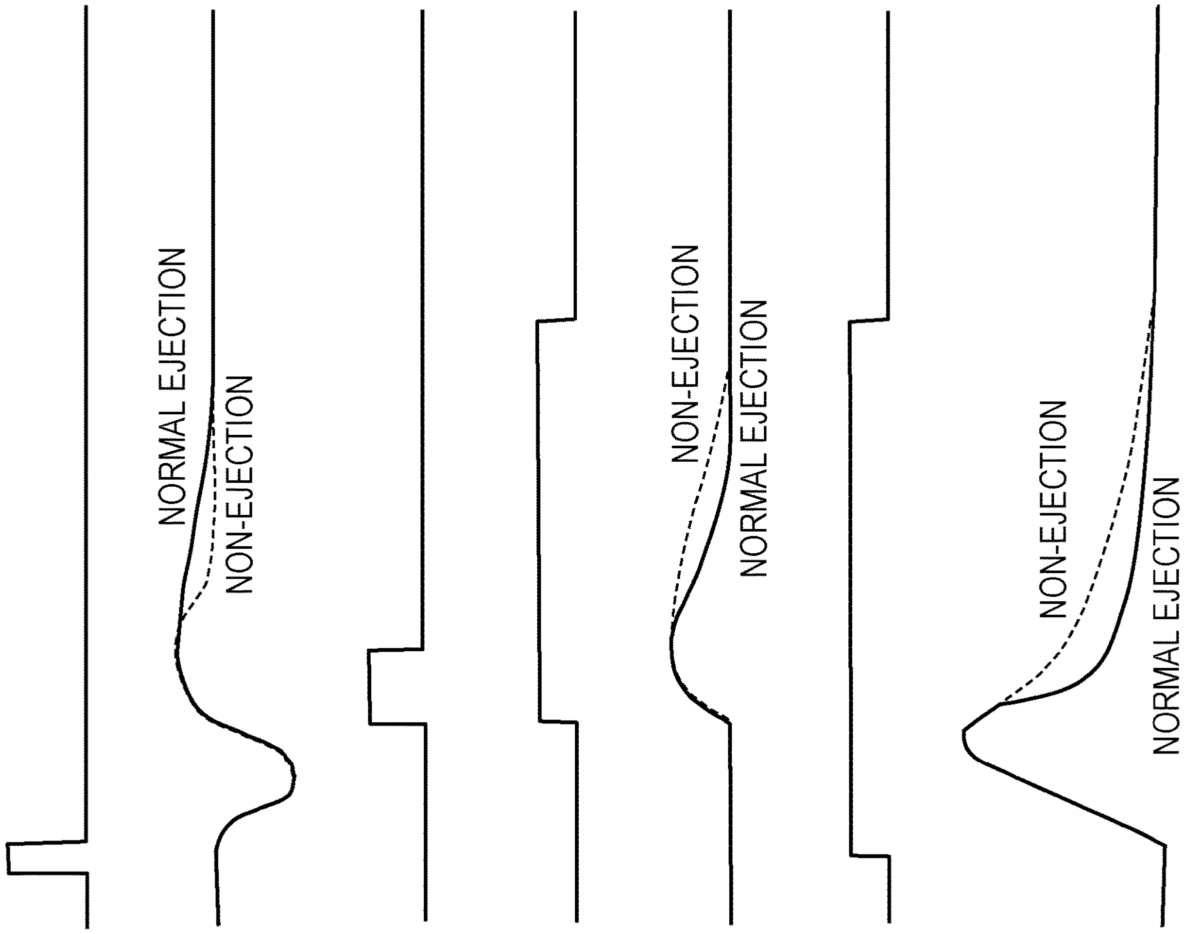
FIGS. 7A to 7G illustrate the operating principle of the liquid ejection head.

A particular example of liquid ejection and a method of detection using the temperature detection element is described below with reference to FIGS. 7A to 7G and FIG. 8 in addition to FIGS. 6A to 6C. FIGS. 7A to 7G are schematic illustrations of the operating principle according to the present embodiment. FIG. 7A is a waveform diagram of a driving pulse applied to the first heating resistance element 102. FIG. 7B illustrates a change in the flow rate of the liquid on the time axis when the direction from the supply port 108 to the ejection port 111 illustrated in FIGS. 6A to 6C is positive. FIG. 7C is a waveform diagram of the current applied to the second heating resistance element 402. FIG. 7D is a waveform diagram of the current applied to the first temperature detection element 115. FIG. 7E is a waveform diagram of the output voltage of the first temperature detection element 115 corresponding to the temperature change of the liquid. FIG. 7F is a waveform diagram of the current applied to the second temperature detection element 605. FIG. 7G is a waveform diagram of the output voltage of the second temperature detection element 605 corresponding to the temperature change of the liquid.

Figure 8:
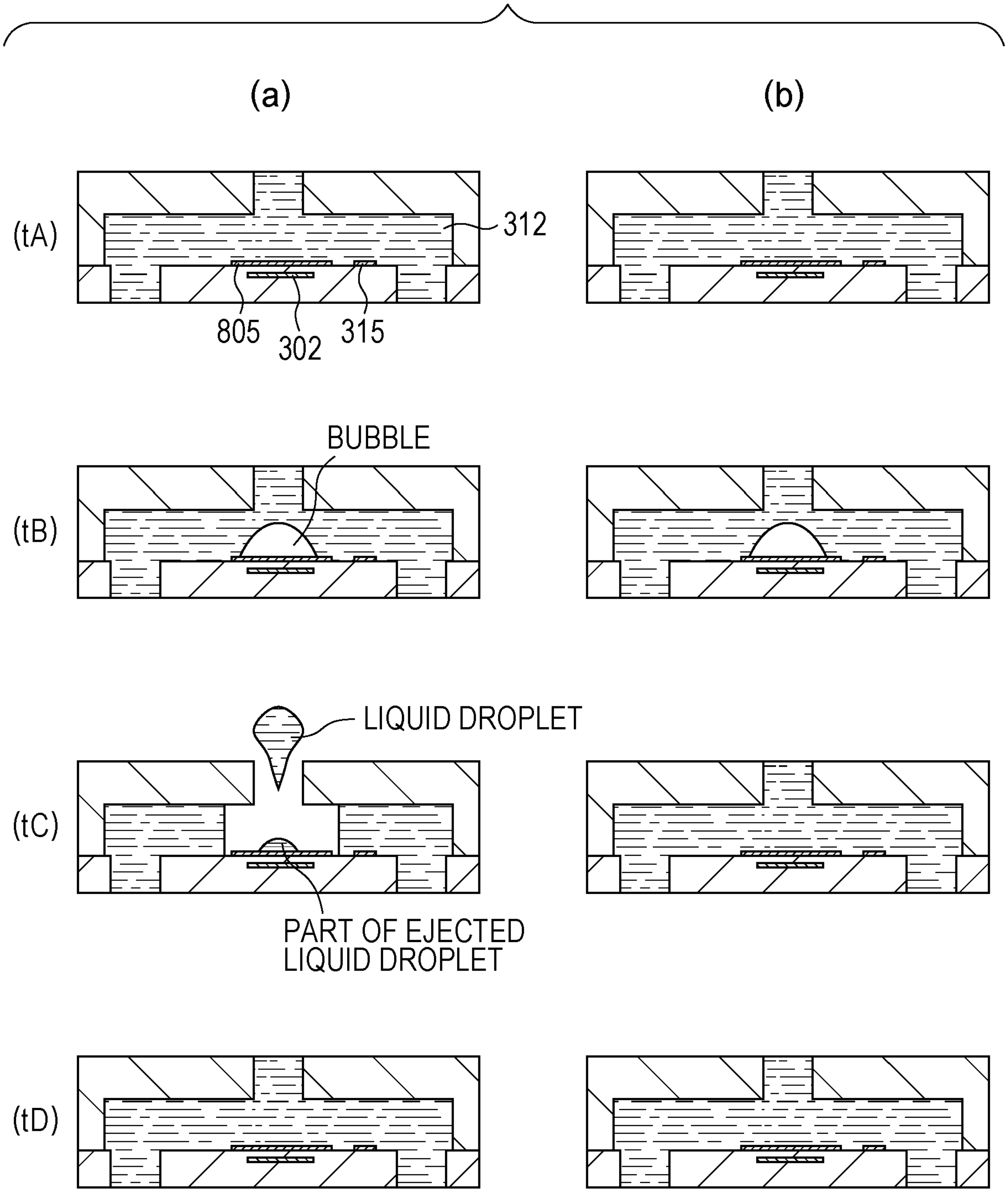
FIG. 8 illustrates the states of the liquid in the foaming chamber of the liquid ejection head.

FIG. 8 is a schematic illustration of the behavior of the liquid in the foaming chamber during the ejection operation according to the present embodiment. For ease of understanding the positional relationship, the first heating resistance element 302, the first temperature detection element 315, a second temperature detection element 805, and the foaming chamber 312 are schematically illustrated. FIG. 8(*a*) illustrates the behavior at the time of normal ejection, and FIG. 8(*b*) illustrates the behavior at the time of typical non-ejection.

The behavior at the time of normal ejection is described with reference to FIG. 8(*a*). When a driving pulse is applied to the first heating resistance element 302 in a steady state (tA), the boiling phenomenon occurs in the liquid above the first heating resistance element 302 inside a foaming chamber and, thus, a bubble grows (tB). When the application of the pulse is completed, the bubble disappears. Along with the disappearance of the bubble, the front part of the liquid separates, and the separated part flies in the air in the form of a liquid droplet and lands on, for example, a recording medium. In addition, the remaining part of the liquid other than the separated part retreats into the foaming chamber 312 due to the negative pressure generated at the time of disappearance of the bubble. This liquid is called the tailing of liquid or part of an ejected droplet and crashes onto the second temperature detection element 805 (tC). As illustrated in FIG. 7G, when part of the ejected droplet crashes onto the second temperature detection element 805, the second temperature detection element 805 is rapidly cooled, and the output voltage of the second temperature detection element 805 rapidly changes. Subsequently, when the foaming chamber 312 is refilled with the liquid, the liquid interface moves toward the ejection port 111. This is done by the capillary force in the foaming chamber 312. As a result, as illustrated in FIG. 7B, if the foaming operation is performed, the liquid once flows toward the supply port 108 and, after the bubble volume is maximized, flows toward the ejection port 111. When the liquid refill is completed, the state returns to the steady state (tD).

The behavior at the time of non-ejection is described with reference to FIG. 8(*b*). When a driving pulse is applied to the heating resistance element 302, a boiling phenomenon occurs and, thus, the bubble grows. However, the liquid is not separated. Since the liquid is not ejected as described above, crash of the tailing of liquid or part of an ejected droplet does not occur as described in FIG. 7G and, thus, the temperature drops gently.

As illustrated in FIGS. 7E and 7G, the difference in the temperature of the liquid between at the time of normal ejection and at the time of non-ejection causes the difference in the detected output voltage. For this reason, it can be determined whether the liquid is being ejected normally.

According to the present embodiment, determination is made using two temperature detection elements that determine a temperature change caused by the presence/absence of crash of part of the ejected droplet onto the second temperature detection element. More specifically, two different phenomena are detected, one of which is the output of the second temperature detection element 605 and the other is the output of the first temperature detection element 115 that makes determination on the basis of the temperature change caused by the difference in refill speed of the liquid. In this manner, high sensitivity can be obtained at all times without being affected by the structural difference and the external factors and, thus, the detection accuracy can be increased. Alternatively, the second temperature detection element 605 can be used for a function of determining whether ejection is normally performed, and the first temperature detection element 115 can be added for another function of detecting, for example, the flow rate of the liquid or the presence/absence of the liquid.

While the present embodiment has been described with reference to the example in which the first temperature detection element 115 is heated by the second heating resistance element 402, the heating technique is not limited thereto. Heating by the second heating resistance element 402 is not always necessary. In particular, if the first temperature detection element 115 is close to the first heating resistance element 102, only the first heating resistance element 102 may sufficiently heat the first temperature detection element 115.

Fourth Embodiment

Figure 9A:
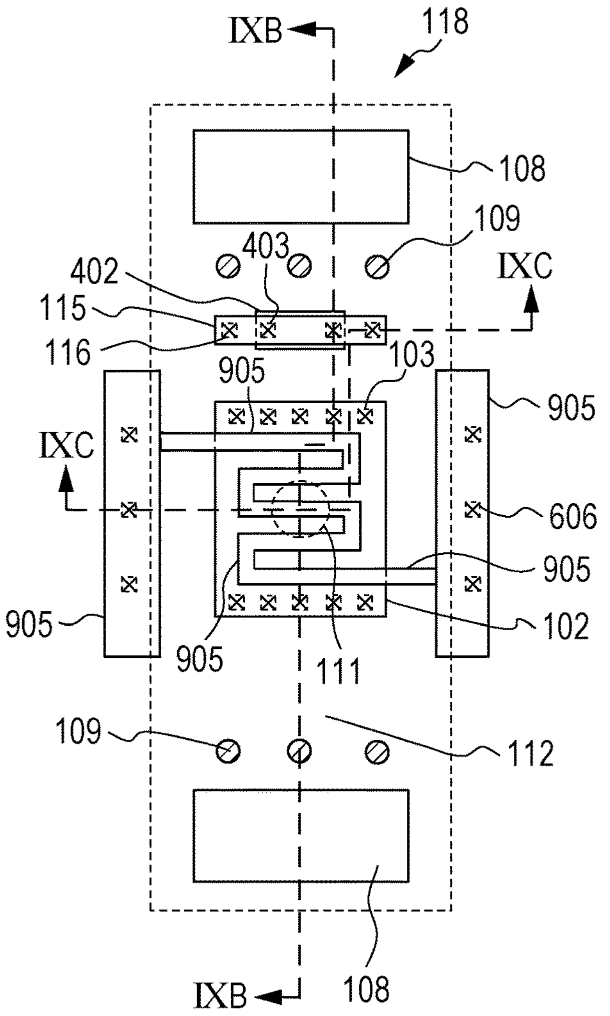
FIGS. 9A to 9C are a plan view and cross-sectional views schematically illustrating a liquid ejection head.
Figure 9B:
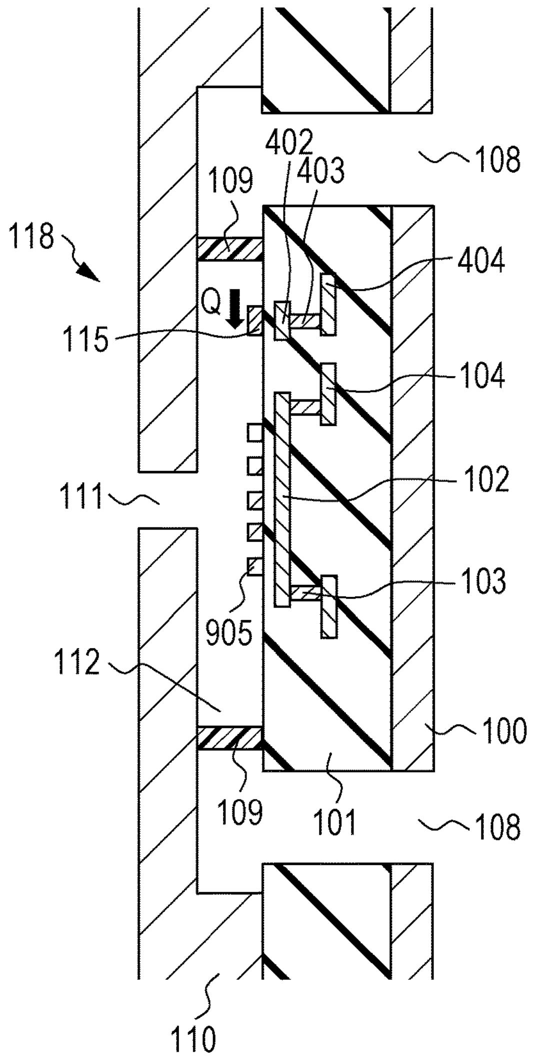
Figure 9C:
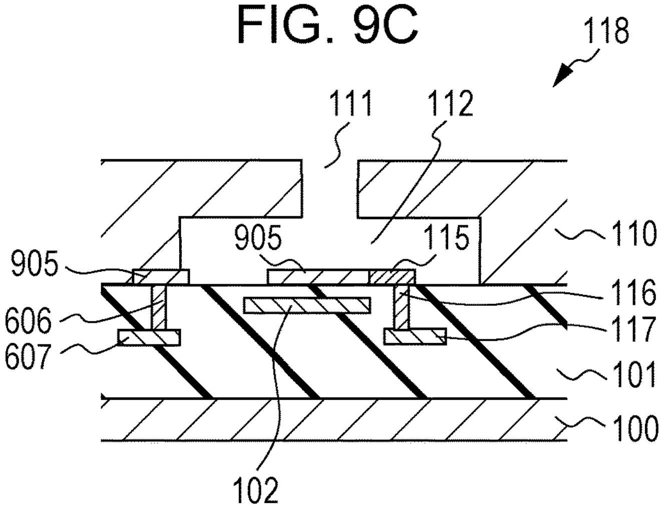

The fourth embodiment is described below with reference to FIGS. 9A to 9C. FIG. 9A is a schematic plan view of a liquid ejection head. FIG. 9B is a schematic cross-sectional view of the liquid ejection head taken along a line IXB-IXB of FIG. 9A. FIG. 9C is a schematic cross-sectional view of the liquid ejection head taken along a line IXC-IXC of FIG. 9A.

The fourth embodiment is described as an example of an embodiment in which the sensitivity is further increased by increasing the resistance of the temperature detection element.

If the resistance value of the temperature detection element is excessively decreased, it is difficult to obtain a sufficient voltage for a circuit operation and, thus, the sensitivity is decreased. For this reason, it is desirable that the temperature detection element have an appropriate resistance value.

According to the fourth embodiment, to increase the resistance value of a second temperature detection element

905, the second temperature detection element 905 is folded back a plurality of times and is disposed. Alternatively, although not illustrated, the second temperature detection element 905 may be disposed in a single line like a bridge in the lateral direction in plan view. Still alternatively, the second temperature detection element 905 may be disposed in the longitudinal direction in the center of the heating resistance element 102 having a relatively high temperature. At this time, the second temperature detection element 905 cannot be expected to have the cavitation resistance function. However, the second temperature detection element 905 can be used in liquid ejection heads that are intentionally designed to have a relatively short life. In addition, although not illustrated, the resistance value of the first temperature detection element 115 can be increased in the same way.

According to the present embodiment, the resistance value of the temperature detection element can be increased, so that higher sensitivity can be obtained.

Fifth Embodiment

Figure 10A:
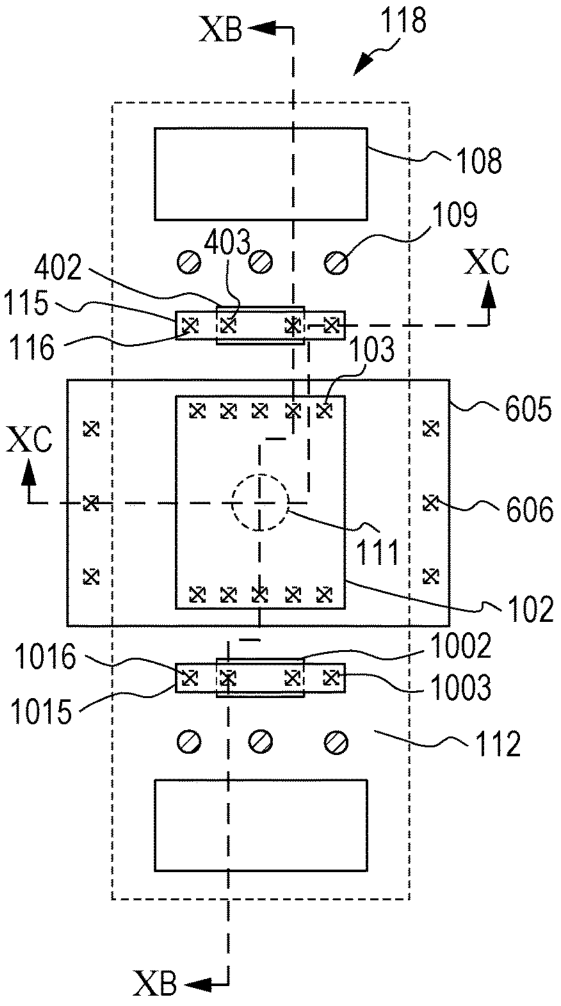
FIGS. 10A to 10C are a plan view and cross-sectional views schematically illustrating a liquid ejection head.
Figure 10B:
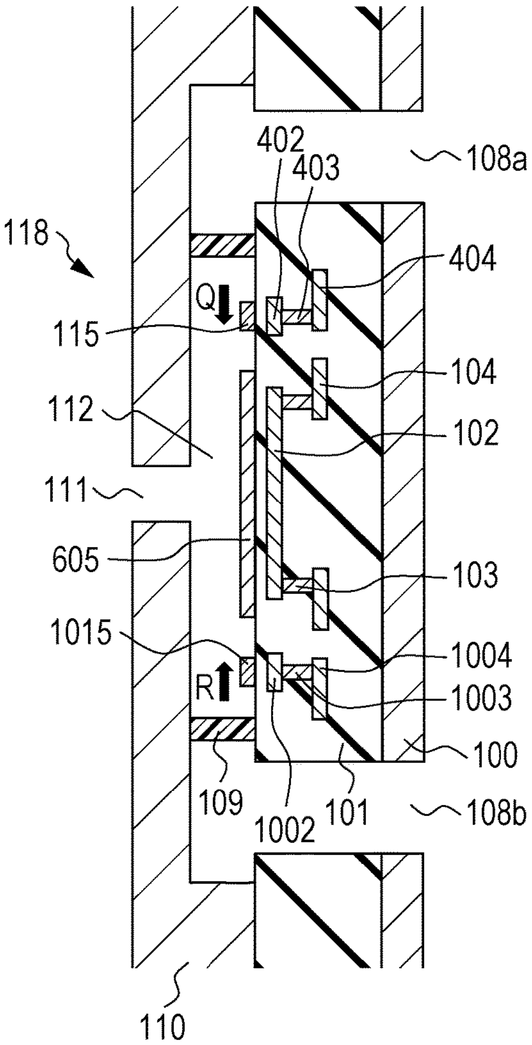
Figure 10C:
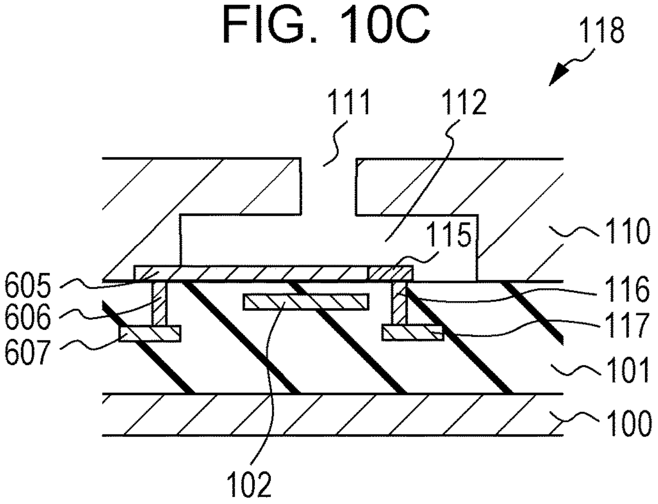

The fifth embodiment is described below with reference to FIGS. 10A to 10C. FIG. 10A is a schematic plan view of a liquid ejection head. FIG. 10B is a schematic cross-sectional view of the liquid ejection head taken along a ling XB-XB of FIG. 10A. FIG. 10C is a schematic cross-sectional view of the liquid ejection head taken along a line XC-XC of FIG. 10A. The fifth embodiment is described as an example of an embodiment in which the sensitivity can be increased or the additional function can be provided by increasing the number of temperature detection elements.

According to the fifth embodiment, the first temperature detection element 115 and a third temperature detection element 1015 are disposed outside a region directly above the heating resistance element 102. The third temperature detection element 1015 is formed on the opposite side of the ejection port 111 from the first temperature detection element 115. It is more desirable that the first temperature detection element 115 and the third temperature detection element 1015 be disposed at positions substantially symmetrical to each other about the ejection port 111. The third temperature detection element 1015 is connected to signal wiring 1017 (not illustrated) via a via 1016. The third temperature detection element 1015 is formed of a single layer or a multilayer of a metal material or alloy having a high coefficient of resistance temperature (for example, iridium, tantalum, titanium, tungsten, silicon, tantalum nitride silicon, or tungsten nitride silicon). If the third temperature detection element 1015 is manufactured using the same material and the same process as the first temperature detection element 115, the third temperature detection element 1015 can be disposed without increasing the manufacturing cost. The via 1016 is formed of, for example, a metal material containing tungsten or copper as a main component. Since the number of temperature detection elements is increasing in this way, higher sensitivity can be obtained by summing the outputs, for example.

Figure 11:
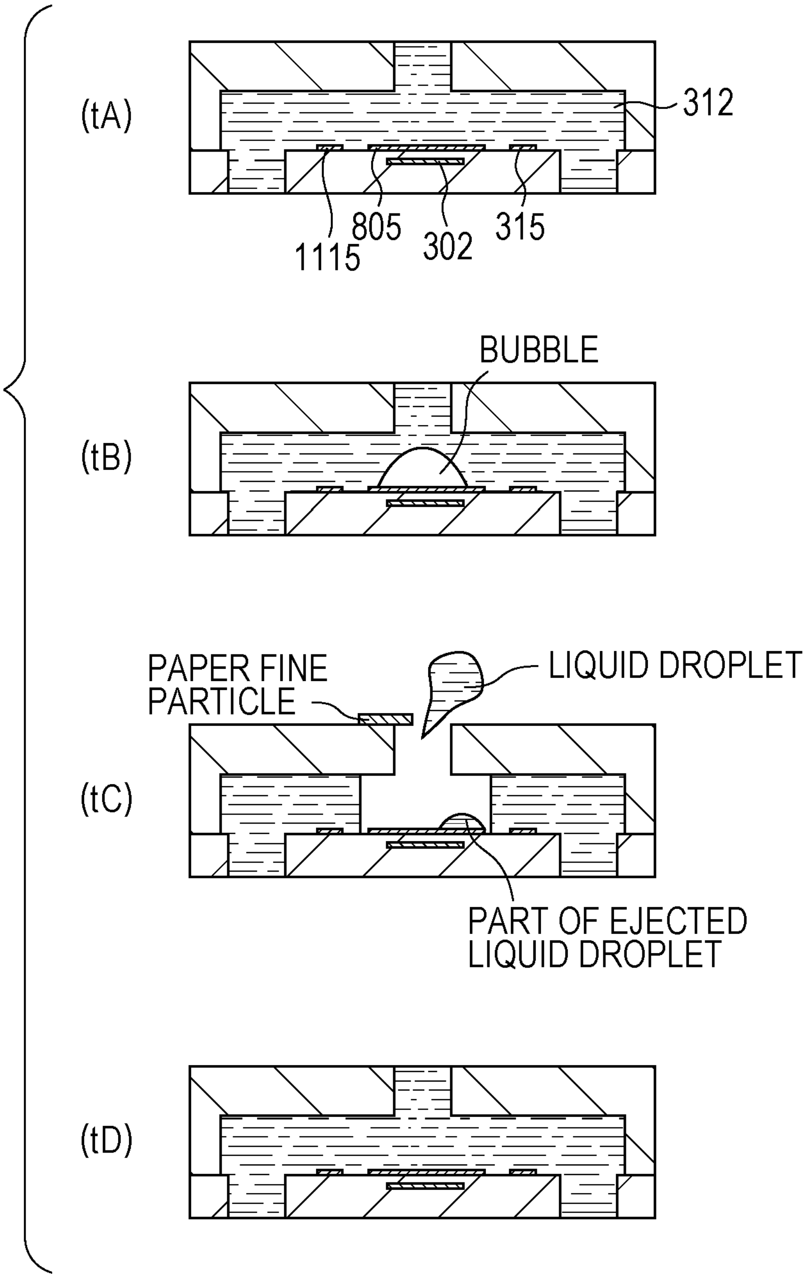
FIG. 11 illustrate the states of the liquid in the foaming chamber of the liquid ejection head.

A particular example of liquid ejection and a method of detection using the temperature detection element is described below with reference to FIG. 11 in addition to FIGS. 10A to 10C. FIG. 11 is a schematic illustration of the behavior of the liquid in a foaming chamber during the ejection operation according to the present embodiment. For ease of understanding the positional relationship, the heating resistance element 302, the first temperature detection element 315, the second temperature detection element 805, a third temperature detection element 1115, and the foaming chamber 312 are schematically illustrated.

Referring to FIG. 11, the behavior when although the ejection is performed, an image is defective is described below. When a driving pulse is applied to the heating resistance element 302 in a steady state (tA), the boiling phenomenon occurs in the liquid above the heating resistance element 302 inside the foaming chamber and, thus, a bubble grows (tB). When the application of the pulse is completed, the bubble disappears. Along with the disappearance of the bubble, the front part of the liquid separates, and the separated part flies in the air in the form of a liquid droplet and lands on, for example, a recording medium. In addition, the remaining part of the liquid other than the separated part retreats into the foaming chamber 312 due to the negative pressure generated at the time of disappearance of the bubble. This liquid is called the tailing of liquid or part of an ejected droplet and crashes onto the second temperature detection element 805. As indicated by (tC) in FIG. 11, when a foreign substance, such as a paper fine particle, is present in the vicinity of the ejection port 111, the droplet flies diagonally and lands on a recording medium at a position deviated from the planned position. If, as described above, the droplet lands on the recording medium at the deviated position, a defective image is generated. In addition, it is known that when a droplet flies diagonally, the crash position of part of the ejected droplet is also deviated. If the crash position of the part of the ejected droplet is deviated, the refill speed of the liquid in the direction of an arrow Q differs from that in the direction of an arrow R. In this way, for example, a function can be provided that detects ejection having a deviated landing position which generates a defective image, although ejection is done, by subtracting one of the outputs of the first temperature detection element 115 and the third temperature detection element 1015 from the other.

Furthermore, for example, in the case of a mechanism by which the liquid circulates from a supply port 108*a* to a supply port 108*b* in the direction of the arrow Q in FIG. 10B, a function can be provided that detects the circulation speed by applying such a current that does not foam the liquid to the heating resistance element 102 to heat the liquid and, thereafter, calculating the output difference between the first temperature detection element 115 and the third temperature detection element 1015.

While the present embodiment has been described with reference to an example in which two temperature detection elements are used outside a region directly above the heating resistance element 102, the number of temperature detection elements is not limited thereto. Three or more temperature detection elements can be used.

According to the present disclosure, a liquid ejection head can be provided that is capable of detecting the temperature of a liquid with high sensitivity.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-151989 filed Sep. 17, 2021, which is hereby incorporated by reference herein in its entirety.

What is claimed is:

1. A liquid ejection head comprising:

a base substrate;

an ejection port configured to eject a liquid;

a first heating element formed above the base substrate, wherein the first heating element heats the liquid to eject the liquid from the ejection port;

a temperature detection element formed above the base substrate, wherein the temperature detection element detects a temperature of the liquid;

a second heating element formed under the temperature detection element;

a protective layer formed on the base substrate, wherein the protective layer protects the first heating element; and a liquid supply port configured to penetrate the base substrate, wherein the liquid supply port supplies the liquid to the first heating element, wherein when viewed in a direction perpendicular to the base substrate, the temperature detection element is disposed between the first heating element and the liquid supply port, wherein, when viewed in the direction perpendicular to the base substrate, the second heating element and the temperature detection element overlap at least partially, and wherein the temperature detection element is formed on the protective layer.

2. The liquid ejection head according to claim 1, wherein the temperature detection element is in contact with the liquid.

3. The liquid ejection head according to claim 1, wherein a cavitation resistance film is formed on the protective layer above the first heating element, and wherein the temperature detection element is formed of the same material as the cavitation resistance film.

4. The liquid ejection head according to claim 1, wherein the temperature detection element is heated before a temperature of the liquid is detected.

5. The liquid ejection head according to claim 1, wherein the first heating element is formed below the temperature detection element.

6. The liquid ejection head according to claim 1, wherein the second heating element is configured to heat the temperature detection element and is formed of the same material as the first heating element.

7. The liquid ejection head according to claim 1, wherein it is determined whether the liquid is normally ejected from the ejection port by using the temperature detection element.

8. The liquid ejection head according to claim 1, wherein when the temperature detection element is defined as a first temperature detection element, a second temperature detection element configured to detect a temperature of the liquid is formed on the protective layer located on the first heating element.

9. The liquid ejection head according to claim 8, wherein the second temperature detection element is formed of the same material as a cavitation resistance film.

10. The liquid ejection head according to claim 8, wherein the second temperature detection element is formed of the same material as the first temperature detection element.

11. The liquid ejection head according to claim 8, wherein the first temperature detection element detects a temperature change caused by a difference between refill speeds of the liquid flowing to the ejection port, and wherein the second temperature detection element detects a temperature change caused by whether part of the liquid ejected from the ejection port crashes onto the first temperature detection element.

12. The liquid ejection head according to claim 8, wherein when viewed in a direction perpendicular to the base substrate, the second temperature detection element is formed so as to be folded back a plurality of times.

13. The liquid ejection head according to claim 1, wherein when the temperature detection element is defined as a first temperature detection element, a third temperature detection element configured to detect a temperature of the liquid is formed on the opposite side of the ejection port from the first temperature detection element.

14. The liquid ejection head according to claim 13, wherein the third temperature detection element is disposed at a position substantially symmetrical to the first temperature detection element about the ejection port.

15. The liquid ejection head according to claim 13, wherein the third temperature detection element is formed of the same material as the first temperature detection element.

* * * * *